United States Patent
Georges et al.

(10) Patent No.: US 7,935,748 B2
(45) Date of Patent: May 3, 2011

(54) ADJUVANT FOR HYDRAULIC COMPOSITIONS

(75) Inventors: Sébastien Georges, Mions (FR); Emmanuel Villard, Saint-Christo-en-Jarez (FR); Olivier Watt, Saint Jean de Soudain (FR); Serge Ghilardi, Mery (FR)

(73) Assignee: Lafarge SA (FR)

( * ) Notice: Subject to any disclaimer, the term of this patent is extended or adjusted under 35 U.S.C. 154(b) by 0 days.

(21) Appl. No.: 12/158,816

(22) PCT Filed: Feb. 2, 2007

(86) PCT No.: PCT/FR2007/000196
§ 371 (c)(1),
(2), (4) Date: Jun. 23, 2008

(87) PCT Pub. No.: WO2007/090948
PCT Pub. Date: Aug. 16, 2007

(65) Prior Publication Data
US 2008/0300344 A1   Dec. 4, 2008

(30) Foreign Application Priority Data
Feb. 6, 2006   (FR) ..................... 06 01043

(51) Int. Cl.
*C04B 24/04* (2006.01)
(52) U.S. Cl. .......................................... 524/5
(58) Field of Classification Search .................. 524/5
See application file for complete search history.

(56) References Cited

U.S. PATENT DOCUMENTS

| | | | | | |
|---|---|---|---|---|---|
| 4,524,042 | A | * | 6/1985 | Genba et al. | 264/211 |
| 5,685,902 | A | * | 11/1997 | Tezuka et al. | 106/643 |
| 5,798,425 | A | * | 8/1998 | Albrecht et al. | 526/271 |
| 6,559,233 | B2 | * | 5/2003 | Bavouzet et al. | 525/244 |
| 6,939,935 | B2 | * | 9/2005 | Valls et al. | 526/317.1 |
| 2004/0009357 | A1 | * | 1/2004 | Kusudou et al. | 428/446 |

FOREIGN PATENT DOCUMENTS

| | | | |
|---|---|---|---|
| FR | 2 861 400 A1 | | 4/2005 |
| JP | 02-092852 | * | 4/1990 |
| JP | 2000-198934 | * | 7/2000 |
| WO | WO 2006/032786 | | 3/2006 |

OTHER PUBLICATIONS

Machine translation JP 2000-198934. Jul. 2000.*
GloKill PQ Brochure.*
An International Search Report dated Jun. 4, 2007 for corresponding International Application No. PCT/FR2007/000196.

* cited by examiner

*Primary Examiner* — Milton I Cano
*Assistant Examiner* — John Uselding
(74) *Attorney, Agent, or Firm* — Lerner, David, Littenberg, Krumholz & Mentlik, LLP

(57) ABSTRACT

The invention provides an admixture for a hydraulic binder composition comprising at least one cationic polymer and at least one anionic polymer, at least one of these polymers having a comb type of structure, wherein the mass ratio of the anionic polymer/cationic polymer is from 99.9/0.1 to 60/40. It also provides a process for its preparation as well as its use as a plasticizer.

12 Claims, No Drawings

ADJUVANT FOR HYDRAULIC COMPOSITIONS

This application is a national stage entry of PCT/FR2007/000196 filed Feb. 2, 2007, which claims priority to FR060143 filed Feb. 6, 2006.

The present invention relates to the field of admixtures for hydraulic binder compositions, and in particular for dispersing, plasticizing, superplasticizing and water-reducing agents.

Generally, admixtures are added to hydraulic binder compositions such as cements to improve their properties. Among the fundamental properties of cement compositions are the rheological properties and their development over time.

Plasticizers are used in particular, those having the effect of fluidizing the cement compositions and/or reducing the amount of added water. This is why they are also designated as water-reducing agents. The cement composition then has a higher density level and results in a material having a higher mechanical strength.

Certain soluble polymers, called superplasticizers, can improve the fluidity of the cement compositions and/or reduce amounts of water even more. Notably, such superplasticizers as polyalkoxylated polycarboxylic acid (PCP) are known. Nonetheless, these admixtures also present inconveniences.

In particular, their performance is known to be very sensitive to variations in the mix designs.

These differences of performances make it necessary to carry out tests in order to determine the dosage of admixture for each hydraulic binder or each aggregate that could be used.

The aim of the invention is to propose admixtures for which the performance is not very sensitive to the chemical nature of the hydraulic composition.

This aim is reached according to the invention by associating in an admixture two ionic polymers with opposite charges.

Solutions of water-soluble polymers with opposite charges are often unstable however, because they tend to aggregate by forming clusters of opposite charges that neutralize each other, leading to their precipitation and cancellation of their property(ies).

It was indeed noted that such an association can be stable when at least one of the two types of polymers presents a comb structure, comprising a main chain and side groups. It is believed that the steric hinderance on the polymer with a comb structure makes it possible to limit the accessibility of the charges and therefore avoid precipitation.

According to a first embodiment, the invention therefore concerns an admixture for f hydraulic binder compositions comprising at least one cationic polymer and at least one anionic polymer, at least one of these polymers having a comb type of structure, in which the mass ratio of the anionic polymer/cationic polymer is comprised from 99.9/0.1 to 60/40.

Within the scope of the present description, the term <<hydraulic binder composition>> designates any hydraulic setting material, notably the compositions comprising cement, such as Portland cement. These compositions could be, for example, mortars further comprising coarse aggregates. The term also embraces calcium sulfates in both anhydrous or hemi hydrate forms.

The term <<polymer>> designates a molecule composed of monomers joined to each other by covalent bonds and characterized by the repetition of one or more types of moieties. This term applies to homopolymers, constituted by the association of molecules coming from one sole moiety, copolymers, for which polymerization occurs on two different monomers and terpolymers, for which polymerization occurs on three different monomers. The polymers obtained from more than three different monomers are also embraced.

The term <<cationic polymer>> designates a polymer for which a substantial part of the constituent units carry a positive charge. The <<cationic polymer>> can also carry negative charges. In this case, there will be a majority of cationic charges in relation to the anionic charges.

In the same manner, the term <<anionic polymer>> designates a polymer for which a substantial part of the constituent units carry a negative charge. The <<anionic polymer>> can also carry positive charges. In this case, there will be a majority of anionic charges in relation to the cationic charges.

The cationic or anionic polymers are accompanied by counter-ions. These can be chlorides, sulfates, nitrates, acetates, etc. for the cationic polymers, sodium, potassium, ammonium, etc, for the anionic polymers. The charges can be located on the main chain or on the side groups. The counterions do not affect the properties of the concrete at the recommended dosages.

The term <<polymer with a comb structure>> designates a polymer having a main chain to which side groups are attached. Preferably, the polymers with a comb structure have polyoxyalkylenated side groups. It is also preferable that they have moieties derived from (meth)acrylic or maleic acid in their main chain.

Generally, the appropriate cationic and anionic polymers for the admixture in the invention are not particularly limited.

The ionic groups can be introduced or generated in the polymer when polymerization occurs or after, for example by grafting a group carrying an ionic function.

Cationic Polymer

The admixture according to the invention first of all contains a cationic polymer.

Notably the cationic groups can be quaternary ammonium, phosphonium, pyridinium, sulfonium groups. Preferably the cationic group can be a quaternary ammonium group.

The quaternary ammonium group can be obtained by quaternization of a nitrogen atom, which can, for example, be part of an amine or imine type of group.

Quaternization, as is known, can notably be done by reaction of an amine or imine group with methyl chloride or by protonation.

Polymers containing an amine or imine type of moiety are therefore particularly appropriate. These groups can be located on the main chain of the polymer, or on the side groups. Preferably, they are located on the main chain.

The cationic polymers with a comb structure advantageously comprise polyoxyalkylenated groups as their side groups.

The cationic polymers can be prepared in the usual manner, notably by radical polymerization or by polycondensation.

The monomers used can be cationic monomers, their precursors, and/or optionally, in a lesser amount, non-ionic or anionic co-monomers.

Among the appropriate cationic monomers can be mentioned: diallyldimethyl ammonium chloride, dialkylaminoalkyl(meth)acrylate, optionally quaternized, and (meth)acrylamide N-substituted by dialkylaminoalkyl, optionally quaternized.

Among the appropriate non-ionic monomers can be mentioned such monomers as methoxypolyethylene glycol (meth)acrylate, acrylamide, N-vinylpyrrolidone, hydroxyethyl (meth)acrylate, N-vinyl-N-methylacetamide, alkyl (meth)acrylates.

Cationic polymers are also accessible by reaction of an epihalohydrin or a diepoxide with a dialkylamine, as described in U.S. Pat. No. 3,725,312 or even by polycondensation of dicyandiamide with formaldehyde, as described in FR 1 042 084.

The cationic groups can also be introduced by modification of a polymer by post grafting. This process comprises modifying a reactive function, for example a hydroxyl or amine group, in order to introduce a cationic group. This way notably opens access to cationic polymers of natural origin, such as starches grafted with a cationic group.

It is possible to modify an acrylamide (co)polymer by the Mannich reaction with an aldehyde such as formaldehyde and an amine such as dimethylamine.

The admixture comprises an anionic polymer as a second component.

The preferred anionic groups are the groups of (meth)acrylic acid and maleic acid or sulfonic acid and their derivatives, notably their salts.

Preferred anionic polymers include the following:
(meth)acrylic, maleic, vinylic, allylic polymers;
polynaphthalene sulfonates;
lignosulfonates;
polymelamine sulfonates.

The anionic polymers can be obtained directly by polymerization, notably radical polymerization, of monomers comprising anionic groups or by modification of a polymer.

Among the appropriate anionic monomers for a radical polymerization can be mentioned notably monomers with carboxylic functional groups such as (meth)acrylic acid, itaconic acid, maleic acid, etc, monomers having sulfonic functions such as acrylamido-2-methyl-2-propanesulfonic acid (AMPS), vinyl sulfonic acid, sulfopropylic acid methacrylate or monomers having phosphonic functions.

In terms of particularly appropriate non-ionic (co)monomers are those that comprise one or more silanol groups or derivatives.

Therefore, the anionic polymer preferably comprises silanol side groups.

The anionic polymers can be of a linear, branched or comb structure, a comb structure being preferred.

The polymers with a <<comb>> structure can be obtained by several synthetic routes, notably by radical co-polymerization as described in EP 0 056 627 or by post-grafting of polyoxyalkylenated side groups, as described in U.S. Pat. No. 5,614,017.

The anionic polymers with a comb structure advantageously comprise polyoxyalkylenated groups as side groups.

Advantageously, the anionic polymers are terpolymers.

According to the invention, at least one of the polymers present in the admixture has a comb structure. Preferably this is the anionic polymer.

The proportion of the ionic groups in the cationic and anionic polymer can vary very widely.

The polymer's charge density, given in meq/g, represents the quantity of charge (in mmol) carried by 1 g of polymer. This value can be measured by colloidal titration or by pH titration.

The density of the ionic groups on the cationic and anionic polymers can vary very widely, but will be preferably more than 0.1 meq/g, preferably more than 0.2 meq/g, respectively.

Advantageously, the cationicity of the cationic polymer does not, or only slightly, depends on the pH.

The anionic and cationic polymers generally present an average molar mass comprised from 10000 to 1M (Mw), preferably from 10000 to 500000 (Mw). The molar mass can notably be determined by measurement of the intrinsic viscosity or by GPC.

Preferably, the polymers have an intrinsic viscosity lower than 1.5 dl/g, in particular, lower than 1.0 dl/g, and more particularly lower than 0.8 dl/g.

The polymerization index Ip is preferably from 1 to 5, preferably from 1.5 to 3.

The described admixture is easily prepared, in known manner for this preparation, for example by simply mixing the polymers with opposite charges in a solution, in a manner known to the person skilled in the art.

The mass ratio of the anionic polymer/cationic polymer is comprised from 99.9/0.1 to 60/40, preferably from 99/1 to 70/30 and more preferably from 98/2 to 80/20.

Additionally, according to another embodiment, the invention is directed to a preparation process of the described admixture, in which at least one cationic polymer and at least one anionic polymer are mixed, at least one of the two polymers having a comb structure, in a suitable solvent, preferably water.

The admixture has remarkable plasticizing properties and is useful for the preparation of fluid hydraulic binder compositions and/or for reducing the quantity of water. Furthermore, it makes it possible to obtain prolonged fluidity, up to 90 minutes. 90-minute fluidity retention is particularly important in the pre-manufactured hydraulic binder compositions such as ready-mix concrete.

Additionally, according to a last embodiment, the invention is directed to use of the described admixture as a plasticizer, and in particular for fluidity retention in hydraulic binder compositions, notably cement compositions, for example Portland cement, mortars and concretes.

Preferably, the admixture is added to the mixing water of the hydraulic binder composition. Adding the admixture beforehand to one of the raw materials of the composition is also envisaged, without affecting the properties of the admixture. The dosage of admixture is determined according to the fluidity of the target hydraulic binder composition. As an example, for mortar compositions, a dosage from 0.10 to 1% dry weight of the plasticizer related to the weight of the cement offers satisfactory results.

The invention will be described in detail using non-limiting examples given below.

EXAMPLES

A. Characterization of the Polymers

The cationic and anionic polymers are characterized by their molecular weight, their ionicity and their structure.

a. Molecular Weight

The molecular weight of the polymers used can be determined by chromatographic analysis or from the intrinsic viscosity according to the formula of Mark-Houwink:

$$IV = K \cdot Mr^a$$

IV: intrinsic viscosity
Mr: average molecular weight
K and a: constants depending on the polymer, the solvent and the temperature.

The measurements of the intrinsic viscosity of the cationic polymers are done with a capillary viscometer such as the Ubbelhode type in a solution of 3M NaCl at 25° C.

The flowing time of the solvent and the solutions of the polymer at different concentrations are measured in a capillary tube between two marks. The intrinsic viscosity is obtained from the <<reduced>> viscosities at different concentrations.

For more details concerning this measurement, the following work is recommended: Encyclopedia of Polymer Science & Technology, Editors Mark and Gaylord, published John Wiley & Sons, 1971, Vol. 14, p. 717-740.

b. Charge Density

The density of the cationic charge (cationicity) or anionic charge (anionicity) given in meq/g represents the quantity of charges (in mmol) carried by 1 g of polymer. This value can be measured by colloidal titration or by pH titration.

The charge density of a cationic polymer can be measured by an anionic polymer with a known level of ionicity, for example potassium polyvinylsulfate, in the presence of an indicator for which the color depends on the nature of the excess polymer.

c. Structure

The structure of the polymers is determined by viscosimetry, Theological measurements and by NMR analyses.

B. Preparation of the Polymers a. Preparation of a Methacrylic Acid/Polyethylene Glycol Methyl Ether Methacrylate Copolymer 1100 (PA1)

In a suitable reactor, provided with mechanical agitation, a heating system and a nitrogen inerting atmosphere, is loaded:

| Tetrahydrofuran | 1502 g |
| --- | --- |
| Methacrylic acid | 113 g |
| Polyethylene glycol methyl ether methacrylate 1100 | 887 g |
| Mercaptoacetic acid | 2 g |

A solution of an initiator is prepared weighing 5.27 g of 2,2'-Azobis-(2,4-dimethylvaleronitrile) (Vazo 52 from Dupont) in 67 g of tetrahydrofuran (THF).

The reaction medium is heated to 60° C. under agitation ensuring degassing under $N_2$. The catalyst solution is added to the reaction medium and the solution is left to react for 5:30 hours at 60° C. temperature. In order to stabilize the THF, a small amount of water is added. It is then distilled under vacuum to eliminate the solvent.

The product obtained is a viscous liquid that is diluted with water to obtain a solution with a concentration close to 20 weight %.

The obtained PA1 polymer has a molar ratio (ester/acid) of 38/62 and a molecular weight of 40000 g/mol and it has a comb structure.

An anti-foaming agent of the tributylphosphate type is added to the solution at a 0.5% mass/solution dosage.

b. Preparation of a Terpolymer of Methacrylic Acid/Ethyl Phosphate Methacrylate/Methoxy PEG2000 Methacrylate This terpolymer is comprised of 66 mol % of methacrylic acid, 9 mol % of ethyl phosphate methacrylate and 25 mol % of methoxy PEG2000 methacrylate.

In a suitable reactor provided with mechanical agitation, a heating system and a nitrogen inerting atmosphere is loaded:

| Water (bottom of the tank) | 1250 g |
| --- | --- |
| Methacrylic acid (monomer phase) | 49.3 g |
| Polyethylene glycol methyl ether methacrylate 2000 - mass concentration 50% (monomer phase) | 869 g |
| Ethyl phosphate methacrylate (monomer phase) | 16.4 g |
| Sodium salt of the 3-mercaptopropane sulfonic acid | 80.6 g |

A solution of an initiator is prepared weighing 12.28 g of 2,2'-Azobis-(2-methylpropionamidine)dihydrochloride (V50 from Wako) in 67 g of water (initiator solution).

The amount of water is loaded in the reactor (bottom of the tank). It is heated to 60° C. under agitation, ensuring degassing under $N_2$. The sodium salt of the 3-mercaptopropane sulfonic acid is then added. The monomer phase is continuously added during 90 minutes, simultaneously to the initiator solution that is added during 120 minutes. The temperature is maintained at 60° C. during the 120 minutes of pouring.

The obtained product is a viscous liquid that is diluted with water to obtain a solution in a concentration close to 20 weight %.

The obtained terpolymer has a molecular weight of 40000 g/mol and has a comb structure.

An anti-foaming agent of the tributylphosphate type is added to the solution at a 0.5% mass/solution dosage.

c. Preparation of a Terpolymer of Methacrylic Acid/Propyltrimethoxysilyl Methacrylate/Methoxy PEG11000 Methacrylate This terpolymer is comprised of 42 mol % of methacrylic acid, 10 mol % of de propyltrimethoxysilyl methacrylate and 48 mol % of methoxy PEG1100 methacrylate.

In a suitable reactor provided with mechanical agitation, a heating system and a nitrogen inerting atmosphere is loaded:

| Methacrylic acid | 30.7 g |
| --- | --- |
| Propyltrimethoxysilyl methacrylate | 21.2 g |
| Methoxy PEG1100 methacrylate | 448.3 g |
| Thioglycolic acid | 4.81 g |

The methacrylic acid, the propyl trimethoxysilyl methacrylate, methoxy PEG1100 methacrylate are weighed in the reactor. This is heated to 80° C. under agitation, ensuring degassing under $N_2$. The thioglycolic acid is then added as well as 8.62 g of AIBN. The reaction medium is then maintained at 80° C. for 2 hours.

The product obtained is a viscous liquid that is diluted with water to obtain a solution in a concentration close to 20 weight %.

The synthesis results in a terpolymer having a molecular weight of 40000 g/mol having a comb structure.

An anti-foaming agent of the tributylphosphate type is added to the solution at a 0.5% mass/solution dosage.

The anionic PA2 polymer is prepared by mixing 20 weight % of the anionic polymer prepared according to protocol b. and 80 weight % of the anionic polymer prepared according to protocol c. described above.

d. Preparation of an Ethyltrimethylammonium Methacrylate Methylsulfate/Methoxy PEG 1100 Methacrylate (PC 2) Copolymer In a suitable reactor provided with mechanical agitation, a heating system and a nitrogen inerting atmosphere is loaded:

| Water | 200 g |
| --- | --- |
| Methoxy PEG 1100 methacrylate (20 mol %) | 49.3 g |
| Ethyltrimethylammonium methacrylate methylsulfate (mass concentration %) | 63.4 g |
| Sodium salt of 3-mercaptopropane sulfonic acid | 1 g |

The necessary amount of water is weighed in the reactor that is heated to 60° C. under agitation, ensuring degassing under $N_2$ for 30 minutes. The sodium salt of the 3-mercaptopropane sulfonic acid is then added, then the monomers and finally 24.28 g of 2,2'-Azobis-(2-methylpropionamidine) dihydrochloride (V50 from Wako). The reaction medium is then maintained at 60° C. for 2 hours.

The obtained product is a viscous liquid that is diluted with water to obtain a solution in a concentration close to 20 weight %.

The synthesis results in a PC 2 copolymer having a molecular weight of 40000 g/mol and having a comb structure.

An anti-foaming agent of the tributylphosphate type is added to the solution at a 0.5% mass/solution dosage.

C. Evaluation of the Admixtures

The efficiency of the admixtures is determined by measuring the spread of mortars prepared with raw materials coming from different origins after 5, 15, 30, 60 and 90 minutes.

In the following protocol, the plasticizer is added to the mixing water.

In the bowl of a Perrier mixer, the sand and then the pre-wetting water is introduced agitating at a low speed (140 tr/min). It is left to rest for 4 minutes before introducing the binders (cement, filler). It is again mixed for 1 minute at a low speed and then the mixing water with the added admixture is added in 30 seconds at low speed. Finally it is mixed for 2 more minutes at 280 tr/min.

The performance of the admixtures was tested for two sands and two different cements for which the origins are given in Chart 1 below.

The 2 sands have different origins. Cement N° 1 contains more sulfates than Cement N° 2.

TABLE 1

Origins of the tested sands and cements

| | |
|---|---|
| Sand N°1 | Standardized siliceous sand conforming to EN 196.1 Standard from the "Societe Nouvelle du Littoral" |
| Sand N°2 | Siliceous-limestone sand from the Palvadeau quarry (Lafarge) |
| Cement N°1 | CEM I - 52.5N - Saint Pierre La Cour (Lafarge) |
| Cement N°2 | CEM I - 52.5N - Le Havre (Lafarge) |

The composition of the mortars prepared with sands N° 1 and N° 2 is given in the respective charts 2 and 3 below.

TABLE 2

Composition of mortar with sand N°1

| | Quantity in g |
|---|---|
| Cement CEM I 52.5 N according to EN 197 | 480.4 |
| Limestone filler | 359.1 |
| Standardized sand 0/2 mm | 1350 |
| Sand PE2LS B2 | 200.1 |
| Pre-wetting water | 100 |
| Plasticizer (dry) | X |
| Mixing water | 227 |
| Total water | 327 |

TABLE 3

Composition of mortar with sand N°2

| | Quantity in g |
|---|---|
| Cement CEM I 52.5 N according to EN 197 | 625.2 |
| Filler BL 200 | 416.2 |
| Palvadeau sand 0/0.315 mm | 444.3 |
| Palvadeau sand 0.315/1 mm | 880.1 |
| Palvadeau sand 1/4 mm | 470.1 |
| Palvadeau sand 2/4 mm | 163.2 |
| Pre-wetting water | 117.5 |
| Plasticizer (dry) | Y |
| Mixing water | 290.8 |
| Total water | 408.3 |

The admixtures according to the invention were prepared by mixing an anionic polymer with a cationic polymer in an aqueous solution at 20 weight % in the proportions given in Table 4.

TABLE 4

Composition of the admixtures

| Example | Cationic polymer (CP) | Anionic polymer (AP) | CP/AP Mass ratio |
|---|---|---|---|
| 1 | CP N°1* | AP N°1 | 1/99 |
| 2 | CP N°1* | AP N°1 | 5/95 |
| 3 | CP N°1* | AP N°1 | 20/80 |
| 4 | CP N°2 | AP N°1 | 30/70 |
| 5 | CP N°2 | AP N°1 | 20/80 |
| 6 | CP N°1* | AP N°2 | 5/95 |
| 7 | CP N°1* | AP N°2 | 20/80 |
| 8 | CP N°3+ | AP N°2 | 5/95 |

*Polycondensate of epichlorohydrin and dimethylamine (FL2250 from SNF, France). This polymer is linear, has a cationicity of 7.3 meq/g and an intrinsic viscosity of 0.04 dl/g.
+Polycondensate of dicyandiamide, formaldehyde and NH$_4$Cl (DEC 50 from SNF, France). This polymer contains few chloride ions.

The spread measurements were done as follows. A bottomless mold with a truncated shape is filled, reproduction at the 0.5 scale of the Abrams cone (see NF 18-451 standard, 1981) with the following dimensions:

| | |
|---|---|
| diameter of the circle of the upper base | 50 +/− 0.5 mm |
| diameter of the circle of the lower base | 100 +/− 0.5 mm |
| height | 150 +/− 0.5 mm | with a freshly prepared mortar in three batches of identical volume, the mortar is tamped between each batch 15 times using a steel tamping rod, 6 mm diameter and with a spherical point. The upper surface of the cone is leveled and then the cone is lifted vertically. The spread is measured at set time intervals according to four diameters at 45° with a calliper square. The result of the spread measurement is the average of the 4 values+/−1 mm. The tests are done at 20° C.

In order to evaluate the sensitivity of the plasticizers according to the invention, spread measurements were done by varying the nature of the sand and the cement. As a comparison, measurements were done with the anionic polymers alone. The results are given in Chart 5 below. The dosage is given in dry weight % of the plasticizer related to the weight of the cement in the mortar composition. The dosage is adjusted so that the 15-minute spread value is from 300 to 340 mm.

TABLE 5

Fluidity retention

| | | | | Spread [mm] | | | | |
|---|---|---|---|---|---|---|---|---|
| Example | Sand | Cement | Dosage | 5 min | 15 min | 30 min | 60 min | 90 min |
| AP1 | 1 | 1 | 0.31 | 345 | 340 | 340 | 335 | 335 |
| | 1 | 2 | 0.13 | 320 | 305 | 280 | 255 | 230 |
| | 2 | 1 | 0.35 | 320 | 320 | 305 | 300 | 285 |
| | 2 | 2 | 0.20 | 325 | 305 | 280 | 250 | 225 |
| AP2 | 1 | 1 | 0.27 | 290 | 310 | 330 | 340 | 325 |
| | 1 | 2 | 0.21 | 320 | 325 | 315 | 290 | 270 |
| | 2 | 1 | 0.50 | 295 | 330 | 345 | 345 | 345 |
| | 2 | 2 | 0.32 | 310 | 320 | 290 | 260 | 240 |
| 1 | 1 | 2 | 0.13 | 330 | 315 | 300 | 285 | 255 |
| | 2 | 1 | 0.36 | 320 | 315 | 310 | 305 | 295 |
| 2 | 1 | 1 | 0.29 | 330 | 330 | 325 | 325 | 325 |
| | 1 | 2 | 0.14 | 330 | 315 | 305 | 290 | 260 |
| | 2 | 1 | 0.37 | 320 | 315 | 315 | 305 | 300 |
| 3 | 1 | 2 | 0.19 | 325 | 335 | 320 | 300 | 270 |
| 4 | 1 | 2 | 0.18 | 325 | 315 | 300 | 280 | 260 |
| | 2 | 2 | 0.33 | 325 | 325 | 315 | 300 | 285 |
| 5 | 2 | 1 | 0.55 | 315 | 310 | 310 | 310 | 320 |

TABLE 5-continued

Fluidity retention

| Example | Sand | Cement | Dosage | Spread [mm] 5 min | 15 min | 30 min | 60 min | 90 min |
|---|---|---|---|---|---|---|---|---|
| 6 | 1 | 1 | 0.24 | 275 | 305 | 325 | 335 | 325 |
|   | 1 | 2 | 0.21 | 305 | 330 | 325 | 310 | 285 |
|   | 2 | 1 | 0.38 | 280 | 315 | 330 | 335 | 330 |
|   | 2 | 2 | 0.32 | 320 | 345 | 340 | 320 | 305 |
| 7 | 1 | 1 | 0.30 | 270 | 305 | 315 | 335 | 330 |
|   | 1 | 2 | 0.24 | 305 | 325 | 315 | 310 | 285 |
|   | 2 | 1 | 0.42 | 265 | 305 | 320 | 330 | 320 |
|   | 2 | 2 | 0.37 | 325 | 345 | 335 | 325 | 290 |
| 8 | 2 | 1 | 0.40 | 290 | 310 | 320 | 320 | 320 |
|   | 2 | 2 | 0.32 | 320 | 335 | 340 | 325 | 295 |

It is possible to observe from the results that the admixtures comprising a cationic polymer and an anionic polymer are more efficient compared to an anionic polymer by itself.

Indeed, the use of a mixture of cationic polymer/anionic polymer makes it possible to reduce the difference of dosage observed between the different compositions of mortar for the anionic polymers alone. Hence, for example 6 and 7, this observed difference of dosage is from 0.17 to 0.18 weight % whereas it is from 0.22 to 0.23 weight % for the anionic polymers alone.

Furthermore, even the smallest presence of the cationic polymer (from 1 to 5 weight %) in the admixture according to example 1 and 2, improves the fluidity retention over time for a same dosage compared to the anionic polymer by itself.

Hence, for a mortar prepared with cement from Le Havre (cement 2) and siliceous-limestone sand from Palvadeau (sand 2) having a low retention over time, an improvement of at least 20% of the spread after 90 minutes is observed compared to the anionic polymers alone.

This improvement is particularly notable at the level of the compositions having a low retention over time. This results in closer retention times observed for the different studied mortars To conclude, it appears from these tests that an admixture comprising an anionic polymer and a cationic polymer such as described can reduce the dosage differences for the hydraulic binders with different chemical compositions and improve the retention losses of the hydraulic binders.

The invention claimed is:

1. A method of fluidizing a cement composition comprising cement and water, comprising:
    forming a plasticizing admixture corresponding to a solution comprising at least one cationic polymer and at least one anionic polymer, at least one of the polymers having a comb type of structure, and the anionic polymer/cationic polymer mass ratio being from 99.9/0.1 to 60/40; and adding the solution to the cement composition in an amount of from 0.10% to 1% dry weight, related to the weight of the cement.

2. The method according to claim 1, wherein the addition of the admixture modifies the fluidity retention of the cement composition.

3. The method according to claim 1, wherein the anionic polymer comprises silanol side groups.

4. The method according to claim 1, wherein the anionic polymer of the plasticizer admixture has a comb type of structure.

5. The method according to claim 4, wherein the polymer having a comb type of structure comprises moieties on its main chain derived from methacrylic acid.

6. The method according to claim 1, wherein the polymer having the comb type structure of the plasticizer admixture comprises polyoxyalkylenated side groups.

7. The method according to claim 1, wherein the anionic polymer has an intrinsic viscosity lower than 1.5 dl/g.

8. The method according to one of claim 1, wherein the anionic polymer has an intrinsic viscosity lower than 1.0 dl/g.

9. The method according to claim 1, wherein the anionic polymer has an intrinsic viscosity lower than 0.8 dl/g.

10. The method according to claim 1, wherein the cationic polymer's cationicity does not depend on the pH.

11. A composition formed according to the method of claim 1.

12. The method according to claim 1, wherein the admixture reduces the required amount of water added to the cement composition.

* * * * *